US012641512B1

(12) United States Patent
Krasilnikov et al.

(10) Patent No.: US 12,641,512 B1
(45) Date of Patent: May 26, 2026

(54) MULTIPATH CONNECTIVITY FOR EDGE LOCATIONS IN A CLOUD PROVIDER NETWORK

(71) Applicant: Amazon Technologies, Inc., Seattle, WA (US)

(72) Inventors: Nikolay Krasilnikov, Seattle, WA (US); John David Fergerson, Seattle, WA (US); Jonathan Mullen, Seattle, WA (US); Anirban Gupta, Seattle, WA (US); Jake Austin Rullman, Seattle, WA (US); Igor A. Kostic, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 594 days.

(21) Appl. No.: 17/936,743

(22) Filed: Sep. 29, 2022

(51) Int. Cl.
*H04W 40/12* (2009.01)
*H04W 28/02* (2009.01)

(52) U.S. Cl.
CPC ....... *H04W 40/12* (2013.01); *H04W 28/0252* (2013.01)

(58) Field of Classification Search
CPC ........................ H04W 40/12; H04W 28/0252
See application file for complete search history.

(56) References Cited

U.S. PATENT DOCUMENTS

| | | | | |
|---|---|---|---|---|
| 10,122,641 B1* | 11/2018 | Kuipers | ............. | H04L 12/2863 |
| 2008/0219281 A1* | 9/2008 | Akin | ................. | H04W 72/0453 |
| | | | | 370/419 |
| 2014/0105033 A1* | 4/2014 | Vasseur | ................... | H04L 45/24 |
| | | | | 370/248 |
| 2019/0253915 A1* | 8/2019 | Joseph | ................. | H04W 80/08 |
| 2022/0078103 A1* | 3/2022 | Prajapat | ............. | H04L 45/3065 |
| 2022/0374277 A1* | 11/2022 | Kim | ................. | H04W 28/0933 |
| 2023/0327763 A1* | 10/2023 | Steeves | .............. | H04W 88/085 |
| | | | | 398/115 |
| 2024/0205198 A1* | 6/2024 | Sood | ................... | H04L 63/0428 |

* cited by examiner

*Primary Examiner* — Michael Thier
*Assistant Examiner* — Tracy Lauren Raimondo
(74) *Attorney, Agent, or Firm* — Perilla Knox & Hildebrandt LLP; Thomas B. Hildebrandt

(57) ABSTRACT

Disclosed are various embodiments that provide multipath connectivity between edge locations and regions in a cloud provider network. In one embodiment, data is received at a provider substrate extension of a cloud provider network, where the data is to be transmitted to a destination in a data center of the cloud provider network. The provider substrate extension is at an edge location of the cloud provider network. The data is transmitted to a destination in the data center of the cloud provider network via a plurality of communication links from the edge location to the data center.

20 Claims, 10 Drawing Sheets

200

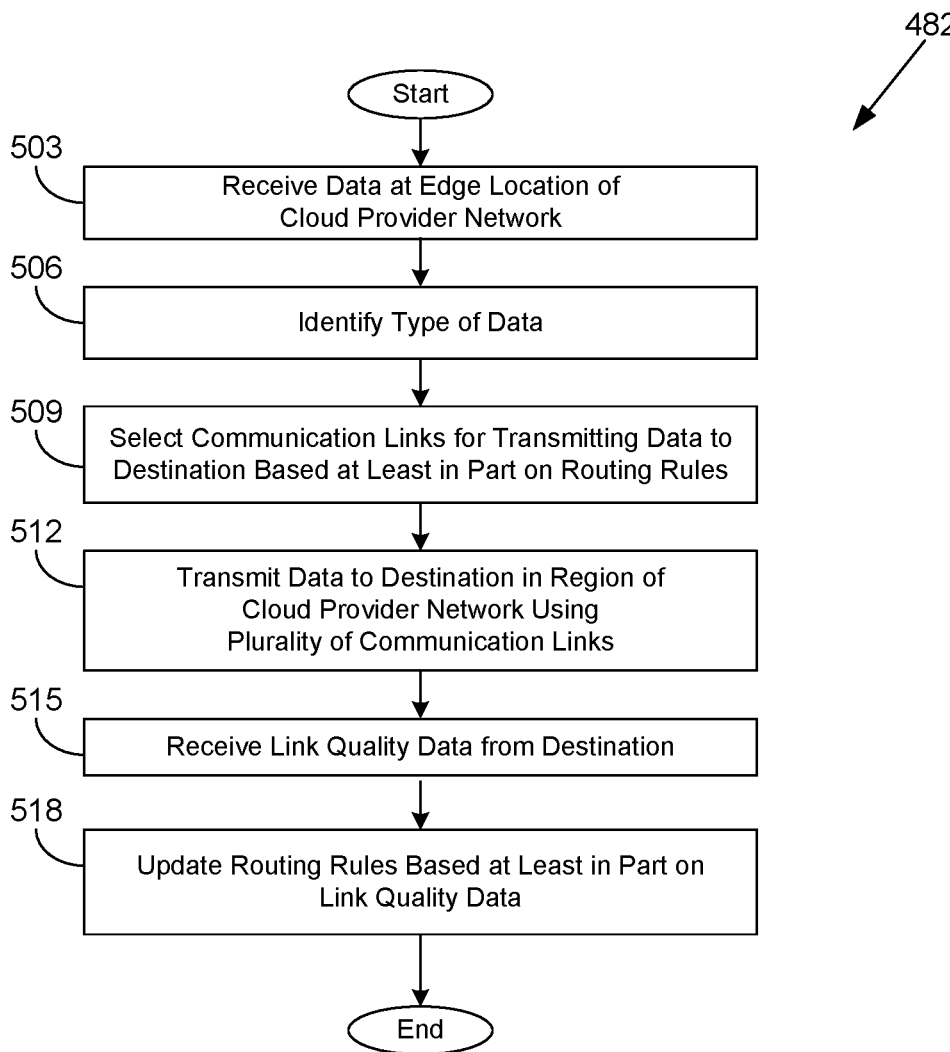

482

Start

503 — Receive Data at Edge Location of Cloud Provider Network

506 — Identify Type of Data

509 — Select Communication Links for Transmitting Data to Destination Based at Least in Part on Routing Rules 512 — Transmit Data to Destination in Region of Cloud Provider Network Using Plurality of Communication Links 515 — Receive Link Quality Data from Destination 518 — Update Routing Rules Based at Least in Part on Link Quality Data End

621 Receive Customer Parameters for Network Traffic

624 Determine Number and Type of Communication Links to Meet Customer Parameters 627 Arrange and/or Allocate Communication Links 630 Determine Configuration for Using Communication Links to Meet Customer Parameters 633 Implement Configuration on Gateways

MULTIPATH CONNECTIVITY FOR EDGE LOCATIONS IN A CLOUD PROVIDER NETWORK

BACKGROUND

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a flowchart illustrating one example of functionality implemented as portions of an edge to region gateway executed in computing hardware in the networked environment of FIG. 2B according to various embodiments of the present disclosure.

DETAILED DESCRIPTION

Figure 1A:
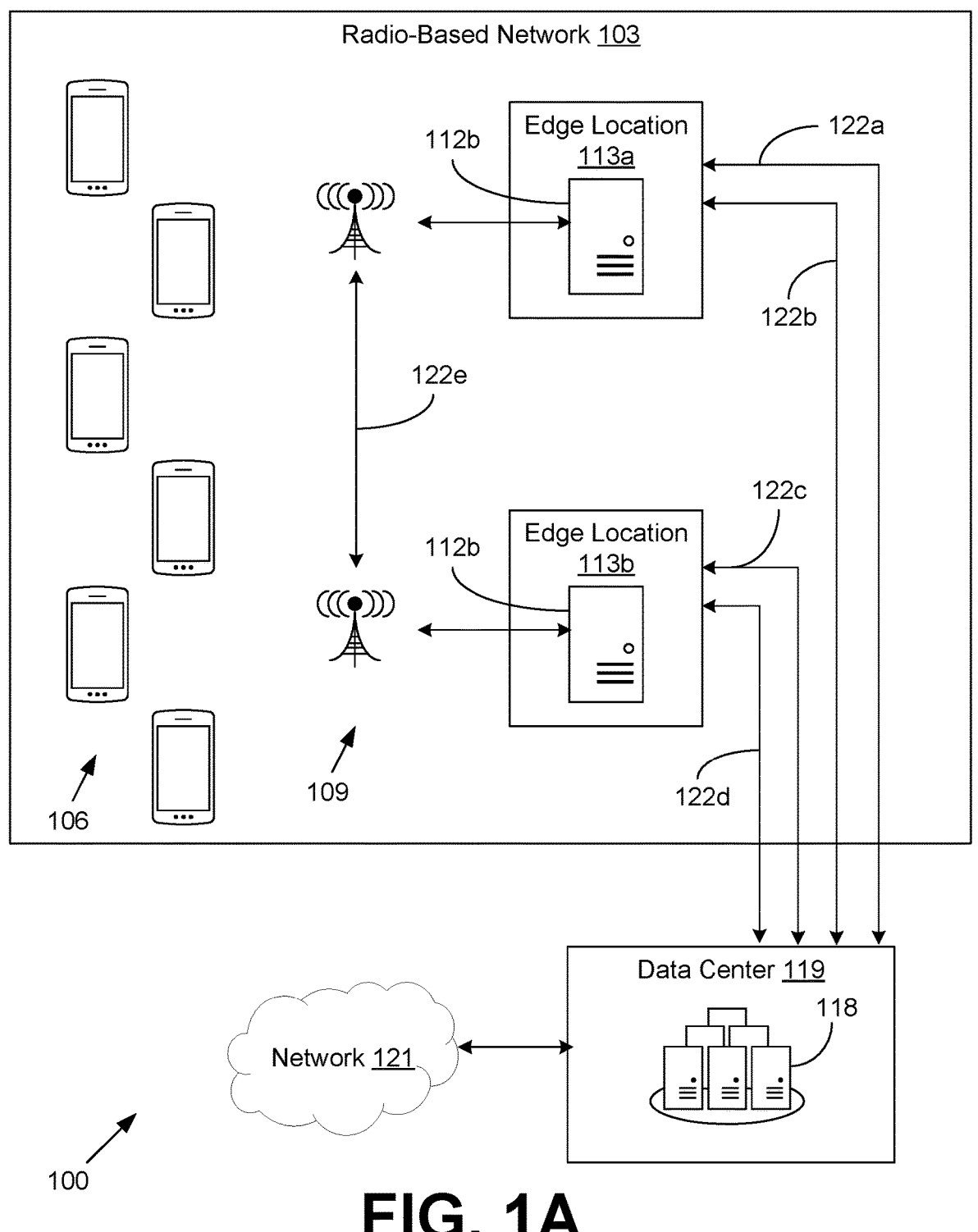
FIG. 1A is a drawing of an example of a communication network that is deployed and managed according to various embodiments of the present disclosure.

The present disclosure relates to providing multipath connectivity for edge servers in a cloud provider network. Cloud provider networks may comprise a combination of regions that host computing capacity within centralized data centers and provider substrate extensions that provide computing capacity from computing devices situated at edge locations. Typically, there is a single backhaul communication link between the edge location and a cloud region. If the single backhaul communication link becomes congested, performance in the cloud provider network can suffer, either based upon services at the edge location that rely upon services at the cloud region, or services at the cloud region that rely upon services at the edge location.

Various embodiments of the present disclosure implement multipath connectivity between edge locations and cloud regions in a cloud provider network. Rather than relying upon a single backhaul communication link, multiple backhaul communication links may be utilized to improve performance. In one scenario, a sender at an edge location may transmit the same data simultaneously across multiple communication links so that a destination in the cloud region will receive the data with the lowest latency possible. In another scenario, the sender at the edge location may split the data to be transmitted across multiple communication links to improve throughput. The data may be distributed or split across the multiple communication links to improve reliability, reduce costs, avoid data caps, and so on.

Several usage scenarios exist for multipath connectivity between edge locations and cloud regions that implement a radio-based network. A radio-based network may comprise a radio access network ("RAN"), such as 4G, 5G, and sixth-generation (6G) radio access networks, and an associated core network. The core, and in some implementations, the RAN, can be implemented at least partly on cloud provider network infrastructure. Network traffic on a radio-based network can generally be divided into data plane traffic and control plane traffic. The data plane traffic includes user data sent to or from user equipment coupled to the radio-based network. By contrast, the control plane traffic on a radio-based network corresponds to network traffic of an administrative nature, relating to authentication, billing, session establishment, handover, logging, and so forth. As will be described, the control plane and/or data plane traffic in a radio-based network may be routed using multipath connectivity between an edge location (e.g., a cell site) and a cloud region that implements at least partly the core network or the RAN in a radio-based network.

As one skilled in the art will appreciate in light of this disclosure, certain embodiments may be capable of achieving certain advantages, including some or all of the following: (1) improving reliability and failover handling for data communication between edge locations and cloud regions; (2) improving latency by sending the same data across multiple communication links between edge locations and cloud regions; (3) increasing throughput by distributing data being sent between an edge location and a cloud region across multiple communication links; (4) improving performance by selecting an optimal communication link out of multiple communication links between an edge location and a cloud region based upon criteria such a time performance, relative cost, and data caps; (5) improving network security by splitting network traffic from an edge location to a cloud region selectively across multiple communication links, thereby limiting unauthorized access of data resulting from interception of one of the communication links; and so forth.

Among the benefits of the present disclosure is the ability of a cellularized control plane, which controls operation of a radio-based network that operates at least partially using cloud provider infrastructure, to deploy and chain network functions together across different physical sites. Cellularization of the control plane refers to having multiple independently operatable copies of the control plane (referred to as "cells"), such that an individual control plane failure is prevented from impacting all deployments. According to the present disclosure, network functions organized into microservices work together to provide end-to-end connectivity (referred to in places as "network function stacks"). One set of network functions are part of a radio network, running in cell towers (or small cells, or radio-equipped cloud provider edge infrastructure, for example) and performing wireless signal to IP conversion. Other network functions run in large data centers performing subscriber related business logic and routing IP traffic to the Internet and back. For applications to use the new capabilities of 5G such as low latency communication and reserved bandwidth, both of these types of network functions need to work together to appropriately schedule and reserve wireless spectrum, and perform real time compute and data processing.

The described "elastic 5G" service provides and manages all the hardware, software, and network functions, required to build a network, and can orchestrate network functions across different physical sites as described herein. In some embodiments the network functions may be developed and managed by the cloud service provider, however the described control plane can manage network functions across a range of providers so that customers can use a single set of APIs to call and manage their choice of network functions on cloud infrastructure. The elastic 5G service beneficially automates the creation of an end-to-end 5G network, from hardware to network functions, thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end network slice that reflects the network characteristics requested by the software application, as well as managing failover to provide the level of availability required by the software application.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premise data center. Some cloud native applications can be containerized, for example having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications. In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure. The communication network 100 includes a radio-based network 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for a public telecommunications provider or for an enterprise or other organization. Various deployments of radio-based network 103 can include one or more of a core network and a RAN, as well as a control plane for running the core and/or RAN on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based network 103 can include a RAN that provides the wireless network access to the plurality of wireless devices 106 through a plurality of cells 109. Each of the cells 109 may be equipped with one or more antennas and one or more radio units (RUS) that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106 and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating, and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112a and 112b at respective edge locations 113a and 113b, as shown, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site. For example, the distributed computing devices 112 may perform distributed unit (DU) functions for the RAN. In some cases, the distributed computing devices 112 may perform centralized unit (CU) functions for the RAN.

In one or more embodiments, network traffic from the radio-based network 103 is backhauled to one or more computing devices in a core network 118 that may be located at one or more data centers situated remotely from the customer's site in a data center 119 of a cloud provider network. The core network 118 may also perform various network functions, including routing network traffic to and from the network 121, which may correspond to the Internet and/or other external public or private networks. The core network 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites. In some cases, functions of the RAN may also be implemented at the data center 119.

Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer-layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

In order to backhaul the network traffic to the core network 118, which may include control plane traffic and/or data plane traffic, there may be one or more communication links 122 between an edge location 113 and a data center 119. The data center 119 may correspond, for example, to a cloud region or cloud local zone. Specifically, in some examples, an edge location 113 may have a plurality of these backhaul communication links 122. For example, the edge location 113a may have a communication link 122a and a communication link 122b to the data center 119, and the edge location 113b may have a communication link 122c and a communication link 122d to the data center 119.

The communication links 122 may be of a same or different type of link. For example, the communication links 122 may comprise fiber links, satellite-based links, terrestrial radio-based links, T-carrier copper links, and so on. The communication links 122 may have different or distinct network access devices, such as network interface cards, modems, transceivers, media converters, as well as different fibers, antennas, cables, etc.

In one scenario, an edge location 113 may have a fiber link and a satellite link to a data center 119. In another scenario, an edge location 113 may have two different fiber links to the data center 119. In yet another scenario, one edge location 113a may have a communication link 122e utilizing the radio-based network 103 (e.g., a 5G wireless link) to backhaul network traffic to a different edge location 113b, which can then backhaul that network traffic via communication links 122c and/or 122d. Such a wireless link could also be considered a distinct communication link 122 between the edge location 113a and the data center 119.

In some scenarios, an edge location 113 may have a first communication link 122 to a first data center 119 and a second communication link 122 to a second data center 119, where the second data center 119 is configured to backhaul traffic to the first data center 119. Such a scenario would also provide multiple communication links 122 between the edge location 113 and the first data center 119, even if the communication links 122 are not directly between the edge location 113 and the first data center 119. In some cases, a virtual private network tunnel may be established over such links to give the practical effect of a virtual connection link 122 between the edge location 113 and the first data center 119. As will be described, in various embodiments, network traffic may be routed selectively through one or multiple ones of the multiple communication links 122 between an edge location 113 and a data center 119 based at least in part on various criteria.

In another example, a communication link 122 may be from the edge location 113 to a transit gateway, such as a network transit hub or regional virtual router that connects on-premises networks with virtual private cloud networks. A transit gateway may scale elastically based on the volume of network traffic. Routing through a transit gateway may operate at layer 3, where the packets are sent to a specific next-hop attachment, based on their destination network addresses.

In another example, a communication link 122 may be from the edge location 113 to a cloud wide area network (WAN). In one embodiment, a cloud WAN is a managed WAN service that is capable of building, managing, and monitoring a unified global network that connects resources running across a cloud provider network and on-premises environments. The cloud WAN may provide a central dashboard that can be used to connect on-premises branch offices, data centers, and virtual private cloud networks across the cloud provider network. Network policies may be used to centrally configure and automate network management and security tasks, and to get a complete view of the network.

In another example, a communication link 122 may be a direct connect from the edge location 113 to a direct connect location of a cloud provider network. In one embodiment, direct connect links an internal network to a direct connect location of a cloud provider network over a standard Ethernet fiber-optic cable. One end of the cable is connected to the on-premises router, while the other is connected to a direct connect router. With this connection, virtual interfaces can be created directly to cloud services or to virtual private cloud networks, bypassing internet service providers in a network path. A direct connect location provides access to a cloud provider network in a region with which it is associated. A single connection in a region may be used to access cloud services from other regions.

Figure 1B:
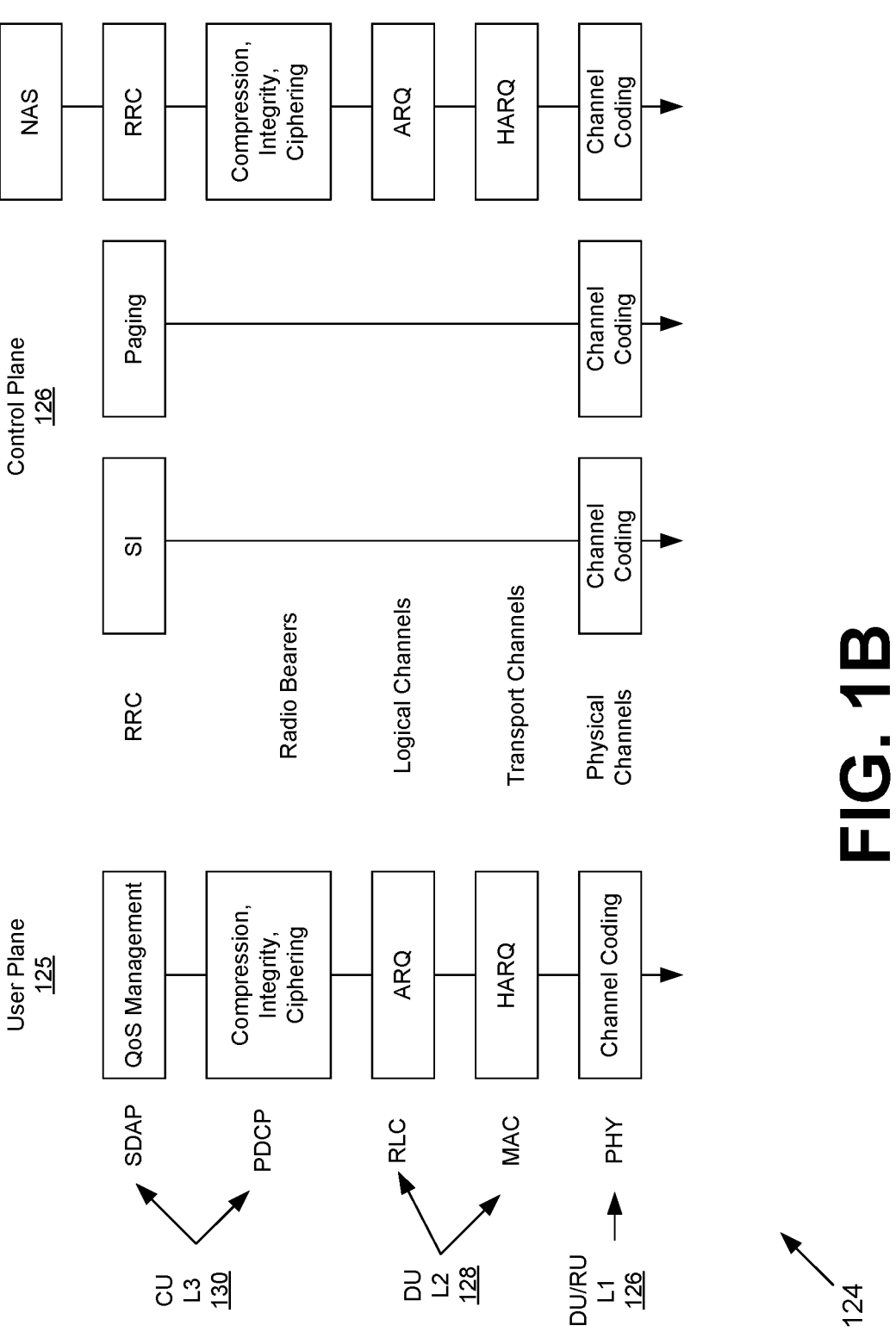
FIG. 1B is a drawing of an example of a radio access network protocol stack employed in various embodiments of the present disclosure.

Moving on to FIG. 1B, shown is an example of a RAN protocol stack 124 employed in various embodiments of the present disclosure. The RAN protocol stack 124 is divided into a user plane 125 and a control plane 126. The RAN is composed of workloads corresponding to the central unit (CU) and the distributed unit (DU). The DUs are connected to radio units (RUs) and an antenna as well as the CUs. In some embodiments, the DUs are located at the edge locations 113, while the CUs are located in data centers 119, so that the communication between the DU and the CU traverses potentially multiple communication links 122.

The L1 126 corresponds to the first layer, which represents the upper physical layer (PHY) that performs channel coding, or digital signal processing (DSP) work. Such DSP work may include Fast Fourier Transforms (FFTs), forward error correction, radio channel estimation, precoding, modulation, and so on, as required for the radio network. The portion of the DU performing L1 work may be connected over an Ethernet network to the RUs.

The L2 128, or second layer, is primarily the scheduling layer, the medium access control (MAC) layer, that schedules uplink and downlink transmission based on individual client devices' radio conditions that may be updated periodically, such as every millisecond or less. The L2 128 decides how best to utilize available radio capacity among existing client devices in order to meet capacity, latency, and traffic requirements. For a cellular network, network traffic to and from client devices is explicitly scheduled by a scheduler. The more efficient the scheduler can be in terms of using the most optimum coding for uplink and downlink, the more client devices can be served with the same hardware, and thus the cheaper and more scalable the solution. By contrast, Wi-Fi networks use a carrier-sense multiple access with collision avoidance (CSMA-CA) protocol where client devices attempt to sense network conditions to avoid collisions, and upon detecting a collision, the client device backs off and then retries. With CSMA-CA, there is no central scheduling of network traffic.

For example, the L2 128 may implement a hybrid automatic repeat request (HARQ) technique, which is a combination of high-rate forward error correction (FEC) and automatic repeat request (ARQ) error-control, at the level of the transport channels. The L2 128 may also implement ARQ error control at the level of the logical channels. For example, Radio Link Control (RLC), a radio link protocol, may be used in order to implement the logical channels. The L1 126 and the L2 128 layers run in the cell sites or in smaller aggregation sites that are relatively close to the RUs due to tight latency constraints.

The L3 130, or third layer, includes the control plane-like layer of the RAN that is responsible for configuration of the other layers and makes decisions around the mobility of client devices across cell sites or RANs. These are CU workloads that can be executed in a cloud provider network because they can tolerate higher latencies. In terms of physical topology, depending on the radio frequency used, there may be multiple cells and base stations (DU/RU sets) per geographical area. The higher the radio frequency, the smaller the area that a single cell can cover. A client device will be connected to exclusively one cell at a time and can handoff to others if the client device changes location or if another cell is better able to accommodate the client device.

At the L3 130, Packet Data Convergence Protocol (PDCP) may be used to implement services including transfer of user plane data, transfer of control plane data, header compression, ciphering, integrity protection, and so forth. Further, the Service Data Adaptation Protocol (SDAP) may be used for quality-of-service (QoS) management. For example, SDAP may map a specific quality-of-service flow within a session to a corresponding Data Radio Bearer established with the appropriate level of QoS. The SDAP may mark the transmitted packets with the correct QoS flow identifier.

The Radio Resource Control (RRC) is also at L3 130 but on the control plane 126 side. The RRC provides an information transfer service to the Non Access Stratum (NAS). The RRC is also responsible for controlling configuration of the radio interface, facilitating the establishment and management of radio bearers, and mobility management and security. The NAS is used to manage the establishment of communication sessions and for maintaining continuous communications with a client device as it moves. The control plane 126 also includes a subscriber identification (SI) channel and a paging channel.

Figure 2A:
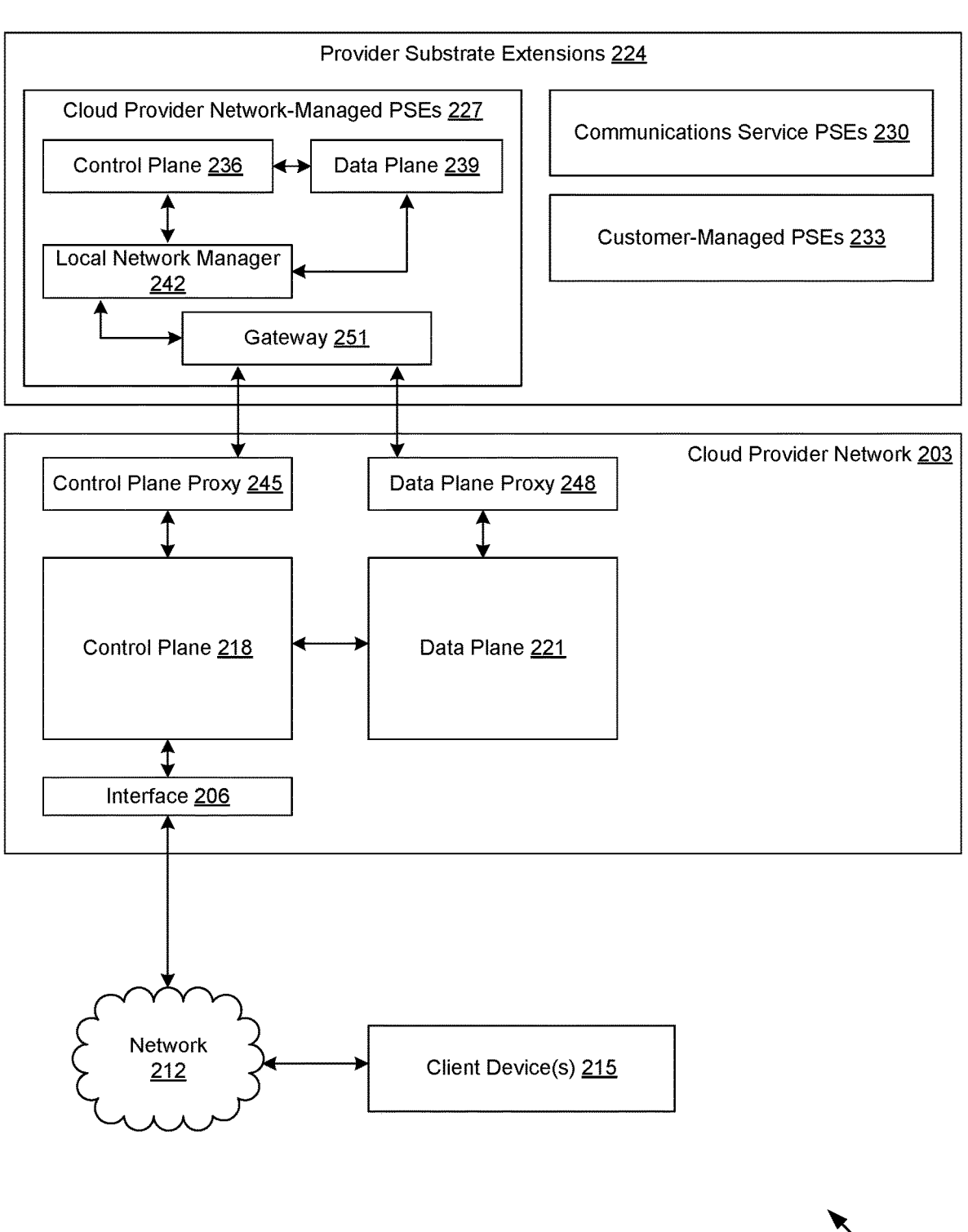
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network 203, which may be used in various locations within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data, as well as software for managing these volumes. These block store servers can support a managed block storage service of the cloud provider network. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network 203. The object storage servers include one or more servers on which data is stored as objects within resources referred to as buckets and can be used to support a managed object storage service of the cloud provider network 203. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a facility such as a customer's premises or a cellular communication network separate from those associated with the cloud provider network 203 but where such servers are still managed by the cloud provider), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g., by the cloud provider network operator, with an appropriate combination of hardware with software and/or firmware elements to support various types of computing-related resources, and to do so in a manner that mirrors the experience of using the cloud provider network 203. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies so an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension 224 will remain in the cloud provider network 203 in order to allow customers to use as much resource capacity of the provider substrate extension 224 as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A provider substrate extension 224 can be connected by way of multiple communication links 122 (FIG. 1A) between the provider substrate extension 224 at an edge location 113 (FIG. 1A) and the cloud provider network 203 at a data center 119 (FIG. 1). Accordingly, data corresponding to network traffic between the provider substrate extension 224 and the cloud provider network 203 at the data center 119 may be routed over multiple communication links 122 at the same time to provide the best available latency, reliability, or other network parameters. Alternatively, the data may be split up and routed selectively over multiple communication links 122 to improve throughput, avoid data usage limits, reduce costs, and so on.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension 224.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads. In some examples, the edge location incorporates radio unit functionality into the same computing device or collection of computing devices that function as a provider substrate extension 224 of the cloud provider network 203.

In the example of FIG. 1A, the distributed computing devices 112 (FIG. 1A) and the core network 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension, and the provider substrate extension 224 can include a router or gateway that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension to a destination on one of the networks can be similarly encapsulated to have the appropriate VLAN tag, source IP address (e.g., from the pool allocated to the provider substrate extension from the destination network address space) and destination IP address.

Figure 2B:
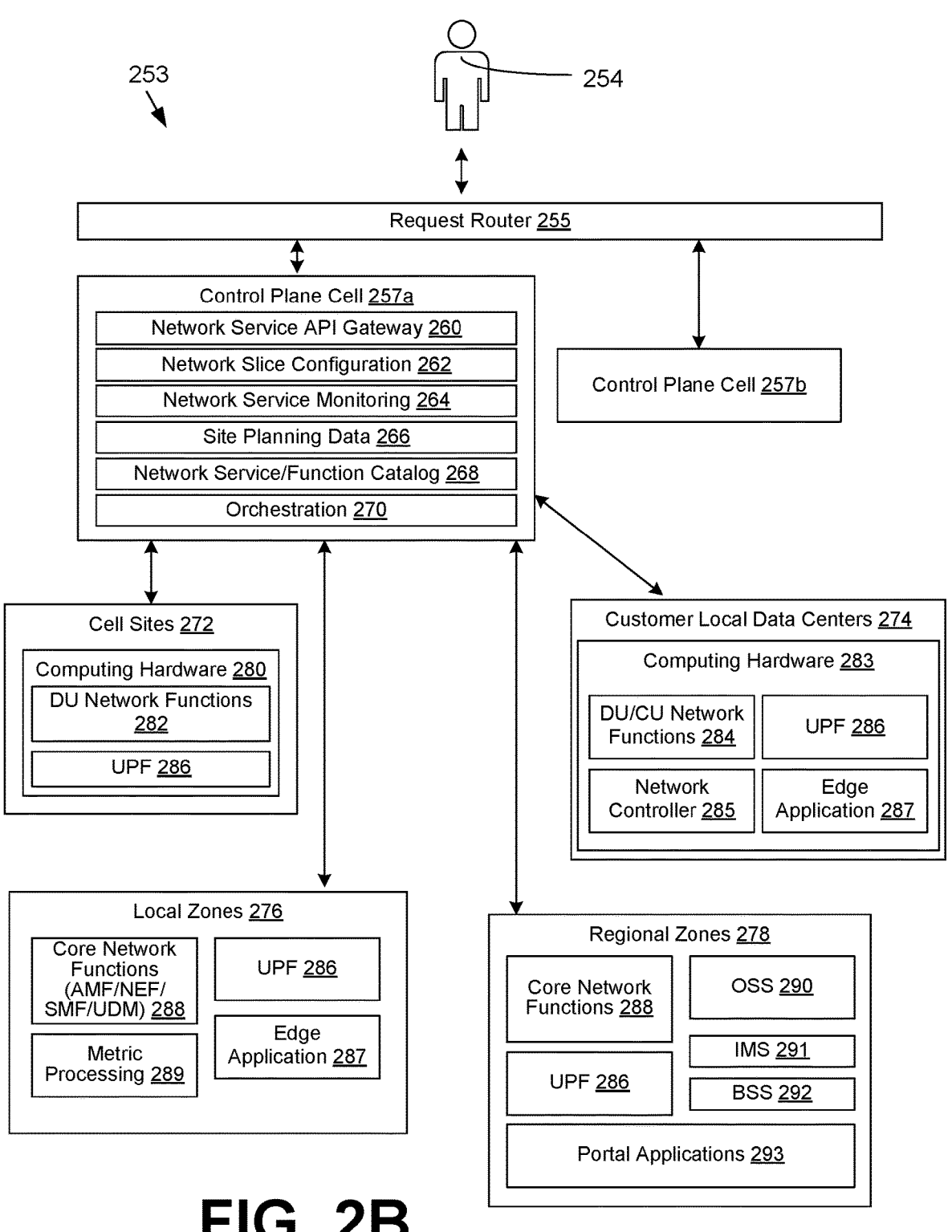
FIG. 2B depicts an example of cellularization and geographic distribution of the communication network of FIG. 1A according to some embodiments of the present disclosure.

FIG. 2B depicts an example 253 of cellularization and geographic distribution of the communication network 100 (FIG. 1A). In FIG. 2B, a user device 254 communicates with a request router 255 to route a request to one of a plurality of control plane cells 257*a* and 257*b*. Each control plane cell 257 may include a network service API gateway 260, a network slice configuration 262, a function for network service monitoring 264, site planning data 266 (including layout, device type, device quantities, etc., that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1A).

The control plane cell 257 may be in communication with one or more cell sites 272, one or more customer local data centers 274, one or more local zones 276, and one or more regional zones 278. The cell sites 272 include computing hardware 280 that executes one or more distributed unit (DU) network functions 282. The customer local data centers 274 include computing hardware 283 (e.g., a PSE 224) that execute one or more DU or central unit (CU) (DU/CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287. In some implementations, such core network functions may be run on a PSE 224 which is more local to the PSE 224 running the DU/CU network functions 284, for example the same PSE 224 or another PSE 224 collocated at the same facility.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the Internet to the local zone 276 can be shifted to endpoints for the regional zones 278. Each control plane cell 257 can implement a "stateless" architecture that shares a common session database across multiple sites (such as across availability zones or edge sites).

Figure 3:
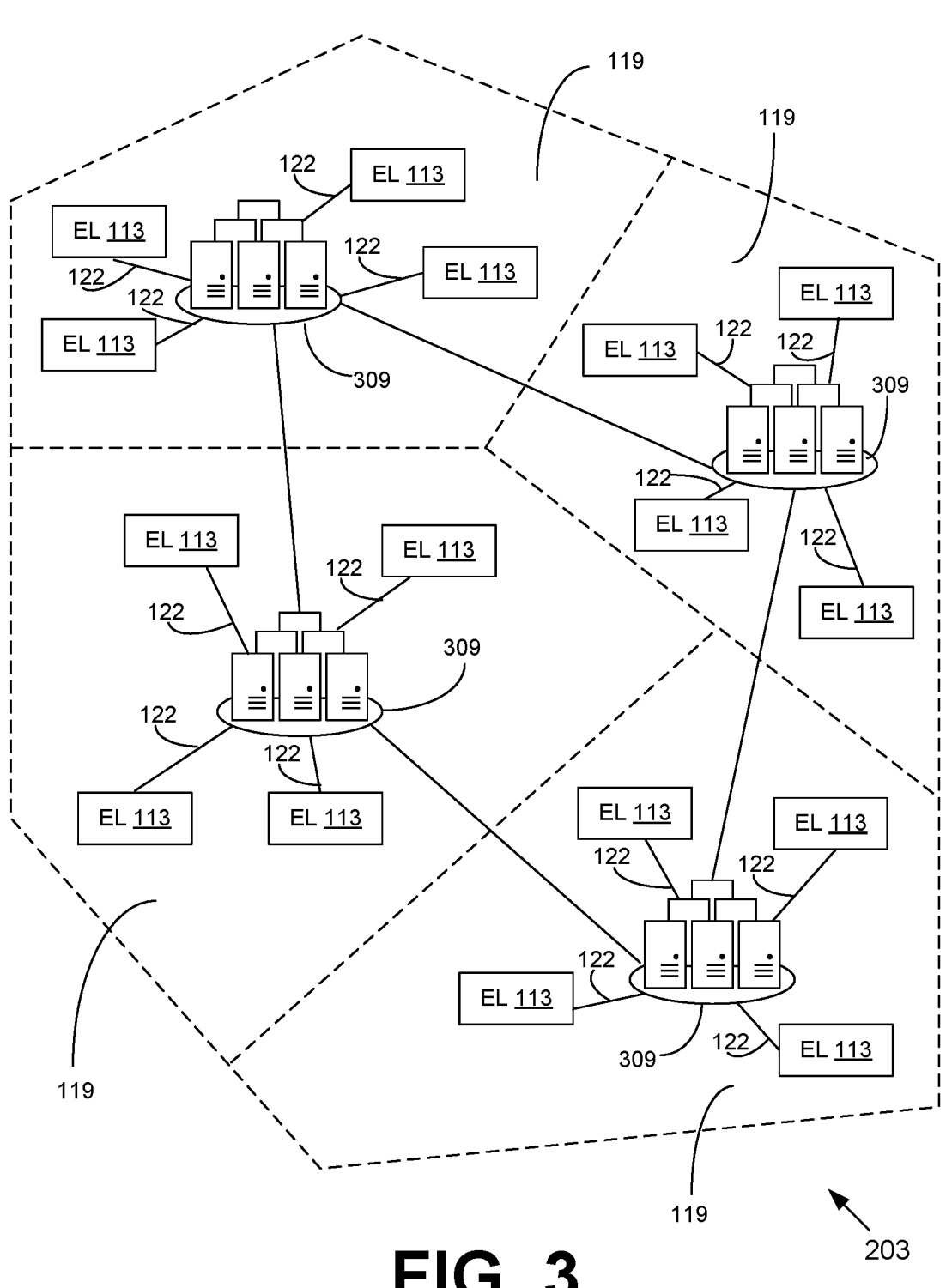
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 113") according to some embodiments. As illustrated, a cloud provider network 203 can be formed as a number of regions 303, where a region 303 is a separate geographical area in which the cloud provider has one or more data centers 309. Each region 303 can include two or more availability zones (AZs) connected to one another via one or more private high-speed network connections such as, for example, a fiber communication connection. An availability zone refers to an isolated failure domain including one or more data center facilities with separate power, separate networking, and separate cooling relative to other availability zones. A cloud provider may strive to position availability zones within a region 303 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 303 can operate two or more TCs for redundancy. Regions 303 are connected to a global network which includes private networking infrastructure (e.g., fiber connections controlled by the cloud service provider) connecting each region 303 to at least one other region. The cloud provider network 203 may deliver content from points of presence (PoPs) outside of, but networked with, these regions 303 by way of edge locations 113 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 113 can be much higher. Such widespread deployment of edge locations 113 can provide low-latency connectivity to the cloud for a much larger group of end user devices (in comparison to those that happen to be very close to a regional data center 309). In some embodiments, each edge location 113 can be peered to some portion of the cloud provider network 203 (e.g., a parent availability zone or regional data center). Such peering allows the various components operating in the cloud provider network 203 to manage the compute resources of the edge location 113. In some cases, multiple edge locations 113 may be sited or installed in the same facility (e.g., separate racks of computer systems) and managed by different zones or data centers 309 to provide additional redundancy. Note that although edge locations 113 are typically depicted herein as within a communication service provider network or a radio-based network 103 (FIG. 1A), in some cases, such as when a cloud provider network facility is relatively close to a communications service provider facility, the edge location 113 can remain within the physical premises of the communication service provider, while being connected to the cloud provider network 203 via one or more communication links 122.

An edge location 113 can be structured in several ways. In some implementations, an edge location 113 can be an extension of the cloud provider network substrate including a limited quantity of capacity provided outside of an availability zone (e.g., in a small data center or other facility of the cloud provider that is located close to a customer workload and that may be distant from any availability zones). Such edge locations 113 may be referred to as local zones (due to being more local or proximate to a group of users than traditional availability zones). A local zone may be connected in various ways to a publicly accessible network such as the Internet, for example directly, via another network, or via a private connection to a region 303. Although typically a local zone would have more limited capacity than a region 303, in some cases a local zone may have substantial capacity, for example thousands of racks or more. Some local zones may use similar infrastructure as typical cloud provider data centers, instead of the edge location 113 infrastructure described herein.

As indicated herein, a cloud provider network 203 can be formed as a number of regions 303, where each region 303 represents a geographical area in which the cloud provider clusters data centers 309. Each region 303 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 303 are positioned far enough away from one another, such that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location 113 to an AZ or region 303 of the cloud provider network 203 can be based on a number of factors. One such parenting factor is data sovereignty. For example, to keep data originating from a communication network in one country within that country, the edge locations 113 deployed within that communication network can be parented to AZs or region 303 within that country. Another factor is availability of services. For example, some edge locations 113 may have different hardware configurations, with the presence or absence of components such as local non-volatile storage for customer data (e.g., solid state drives), graphics accelerators, etc. Some AZs or region 303 might lack the services to exploit those additional resources, thus, an edge location could be parented to an AZ or region 303 that supports the use of those resources. Another factor is the latency between the AZ or region 303 and the edge location 113. While the deployment of edge locations 113 within a communication network has latency benefits, those benefits might be negated by parenting an edge location 113 to a distant AZ or region 303 that introduces significant latency for the edge location 113 to region traffic. Accordingly, edge locations 113 are often parented to nearby (in terms of network latency) AZs or regions 303.

Additionally, the disclosed service can provide a private zone to run local applications within a cloud provider network 203. This private zone can be connected to and effectively part of a broader regional zone, and allows the customer to manage the private zone using the same APIs and tools as used in the cloud provider network 203. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Figure 4:
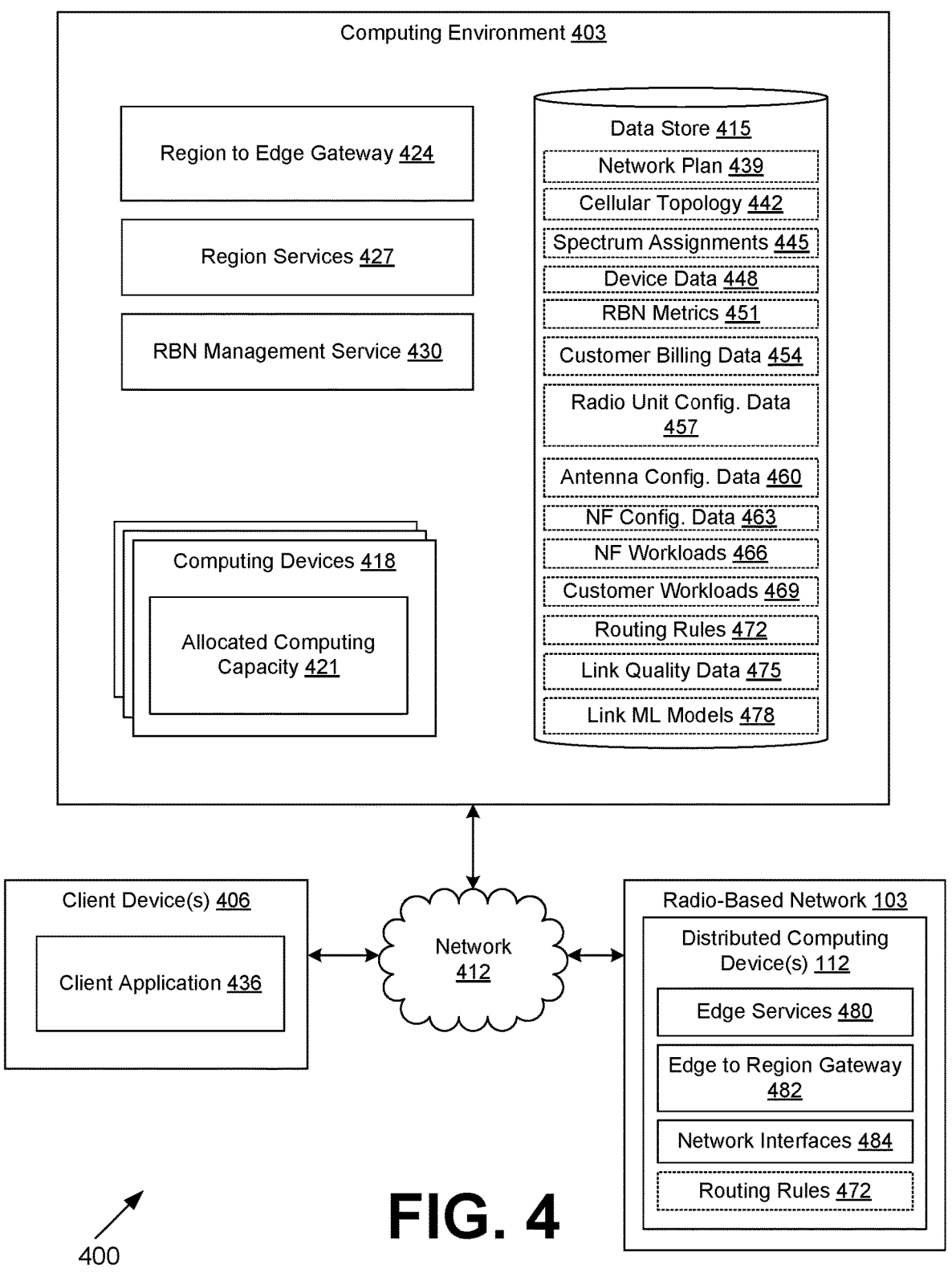
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203 (FIG. 2A), where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices 418. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUS), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include one or more region to edge gateways 424, one or more region services 427, and other applications, services, processes, systems, engines, or functionality not discussed in detail herein. Each of these components may be executed as allocated computing capacity 421 on computing devices 418 that may be located at customer sites, at local zone data centers, at region data centers, and so on.

The region to edge gateway 424 is executed to receive data transmitted by a sender at an edge location 113 via multiple communication links 122. Such data may correspond to multiple copies of the same data but transmitted over different communication links 122. When multiple copies of the same data are received, the region to edge gateway 424 may discard the late arriving data. In some cases, the region to edge gateway 424 may utilize the late arriving copy for error correction. The region to edge gateway 424 may transmit a single copy of the data to a destination region service 427.

Alternatively, different portions of the data may be sent through the different communication links 122. In some cases, the region to edge gateway 424 may be an endpoint for a virtual private network tunnel between the data center 119 and the edge location 113 over one or more of the communication links 122. The region to edge gateway 424 may be executed as part of a destination; for example, on the same computing device or integrated within a region service 427. Alternatively, the region-to-edge gateway 424 may correspond to an intermediate host that demultiplexes the network traffic from the multiple communication links 122 for forwarding to a destination (e.g., the region service 427). The region to edge gateway 424 may track performance metrics for each of the multiple communication links 122 and report link quality metrics to the edge location 113.

The region services 427 are executed in the data center 119 to perform desired functionality. In some scenarios, the region services 427 may perform one or more network functions for a core network 118 (FIG. 1A), such as the core network functions 288 (FIG. 2B), the UPF 286 (FIG. 2B), the OSS 290 (FIG. 2B), the IMS 291 (FIG. 2B), the BSS 292 (FIG. 2B), one or more portal applications 293 (FIG. 2B). In some scenarios, the region services 427 may execute CU-related network functions. In other embodiments, the region services 427 may perform arbitrary functionality for a customer that is distinct from the operation of a radio-based network 103.

The RBN management service 430 is executed to deploy and manage radio-based networks 103. In particular, the RBN management service 430 is executed to manage, configure, and monitor radio-based networks 103 that are operated by a cloud service provider or other communication service providers on behalf of customers. To this end, the RBN management service 430 may generate a number of user interfaces that allow customers to place orders for new radio-based networks 103, scale up or scale down existing radio-based networks 103, modify the operation of existing radio-based networks 103, configure wireless devices 106 (FIG. 1A) that are permitted to use the radio-based networks 103, provide statistics and metrics regarding the operation of radio-based networks 103, reserve frequency spectrum for a customer's private networks via a spectrum reservation service, and so on. For example, the RBN management service 430 may generate one or more network pages, such as web pages, that include the user interfaces. Also, the RBN management service 430 may support this functionality by way of an API that may be called by a client application 436. In addition to facilitating interaction with users, the RBN management service 430 also implements orchestration of deployments and configuration changes for the radio-based networks 103 and on-going monitoring of performance parameters. In some cases, the RBN management service 430 may generate a network plan 439 for a customer based at least in part in a specification of the customer's location, an automated site survey by an unmanned aerial vehicle, and/or other input parameters.

In some embodiments, the RBN management service 430 receives customer parameters relating to desired latency, throughput, reliability, cost, and so on, and based at least in part on these parameters, arranges and/or allocates the appropriate number and type of communication links 122 between the edge locations 113 and the data center 119. For example, the RBN management service 430 may initiate ordering a fiber or satellite link, or the RBN management service 430 may reallocate existing communication links 122 between the edge location 113 and a data center 119. The RBN management service 430 may also decide how data is transmitted using the communication links 122 in order to meet the customer-specified objectives. For example, the RBN management service 430 may decide whether a type of data is replicated across multiple communication links 122 in order to meet a target latency, or whether a type of data is split across multiple communication links 122 in order to increase throughput. In various embodiments, the RBN management service 430 implements a fitness function in order to match communication link 122 configurations to customer objectives.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, one or more customer workloads 469, one or more routing rules 472, link quality data 475, one or more link machine learning models 478, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality of service parameters for applications or services, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters.

The spectrum assignments 445 include frequency spectrum that is available to be allocated for radio-based networks 103, as well as frequency spectrum that is current allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based network 103. This device data 448 includes corresponding users, account information, billing information, data plan, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizonal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances located in computing devices 418 that are at cell sites 272 (FIG. 2B), at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421. For example, the customer workloads 469 may provide or support a customer application or service.

The routing rules 472 determine which of multiple communication links 122 between a data center 119 and an edge location 113 will be utilized for sending and/or receiving data. In some cases, the routing rules 472 may specify that respective copies of the same data be sent over multiple communication links 122 so that the data arrives with minimum latency or interruptions. For example, data may be sent simultaneously over both a satellite link and a cellular link. In other cases, the routing rules 472 may specify that different portions of the data be sent over multiple communication links 122. For example, the routing rules 472 may specify that a first portion of data is sent over a first fiber link, while a second portion of data is sent over a second fiber link, so that the overall throughput is increased.

The routing rules 472 may take into account one or more factors such as cost, data usage caps, latency, jitter, dropped packets, relative bandwidth, type of data being transmitted (e.g., quality of service level, security sensitivity level, application type, etc.), and/or other factors. It is noted that various factors such as cost and reliability may vary over time or based upon regular periods (e.g., a certain time frame on weekdays may be associated with poorer performance on a communication link 122). The routing rules 472 may be adapted over time based upon link quality data 475 and/or the link machine learning models 478.

The link quality data 475 provides metrics regarding link quality such as, for example, latency, jitter, frequency of dropped packets, estimated available bandwidth, and/or other information. The link quality data 475 may be generated at the region to edge gateway 424 and sent to the edge to region gateway 482, or vice versa. The link quality data 475 may be transmitted periodically (e.g., every minute) or in response to certain events (e.g., latency or another metric exceeding a threshold, or a change to a metric that exceeds a threshold).

The link machine learning models 478 are machine learning models for each particular communication link 122 or type of communication link 122 that are trained based upon observing network traffic patterns. For example, a particular communication link 122 may be particularly congested between 2 and 5 p.m. on weekdays, and in observing link quality data 475, the pattern may be automatically ascertained through a regression analysis. Accordingly, the link machine learning models 478 may be used for predicting latency, throughput, jitter, dropped packets, and other parameters that may be relevant for selecting particular communication links 122 to use out of multiple potential communication links 122 in order to reduce latency, increase throughput, or achieve another objective.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. For example, the client application 436 may be used to configure the routing rules 472 and/or other parameters of operation relating to selection of one or more of multiple communication links 122 between an edge location 113 and a data center 119. The client device 406 may be configured to execute applications beyond the client application 436 such as, for example, email applications, social networking applications, word processors, spreadsheets, and/or other applications.

The radio-based network 103 includes one or more distributed computing devices 112, which may correspond to a provider substrate extension 224 (FIG. 2A) of a cloud provider network 203. In some cases, the distributed computing devices 112 may be independent of a radio-based network 103.

The components executed on the distributed computing devices 112, for example, include one or more edge services 480, one or more edge to region gateways 482, a plurality of network interfaces 484, and other applications, services, processes, systems, engines, or functionality not discussed in detail herein. The edge services 480 are executed to perform desired functionality at an edge location 113, such as a cell site 272 (FIG. 2B), a local zone 276 (FIG. 2B), or a customer local data center 274 (FIG. 2B). In some scenarios, the edge services 480 perform network functions for a radio-based network 103; for example, the edge services 480 may correspond to DU network functions 282 (FIG. 2B), a UPF 286, an edge application 287 (FIG. 2B), metric processing 289 (FIG. 2B), core network functions 288, and/or other components.

The edge to region gateway 482 is executed to receive data from the edge services 480 and to transmit that data to a destination in the data center 119 (e.g., a region service 427 in the computing environment 403) by way of multiple communication links 122. In transmitting the data, the edge to region gateway 482 may determine, e.g., utilizing the routing rules 472, to utilize one or more of the multiple communication links 122 available between the edge location 113 and the data center 119. For example, the edge to region gateway 482 may determine to transmit multiple copies of the same data via multiple communication links 122.

Each of the network interfaces 484 may correspond to a distinct communication link 122. For example, the network interfaces 484 may correspond to Ethernet, fiber, radio, satellite, and/or other interfaces. In various examples, the communication links 122 may be asymmetrical or symmetrical for uplink and downlink. In various examples, the communication links 122 may include separate uplink and downlink connections or uplink and downlink may be hybridized over a single connection.

Referring next to FIG. 5, shown is a flowchart that provides one example of the operation of a portion of the edge to region gateway 482 according to various embodiments. It is understood that the flowchart of FIG. 5 provides merely an example of the many different types of functional arrangements that may be employed to implement the operation of the portion of the edge to region gateway 482 as described herein. As an alternative, the flowchart of FIG. 5 may be viewed as depicting an example of elements of a method implemented in the distributed computing device 112 (FIG. 4) according to one or more embodiments.

Beginning with box 503, the edge to region gateway 482 receives data at an edge location 113 (FIG. 1A) of a cloud provider network 203 (FIG. 2A). The edge location 113 may correspond to a distributed computing device 112 (FIG. 1A). The edge location 113 may also correspond to a provider substrate extension 224 (FIG. 2A). The data may be generated by an edge service 480 (FIG. 4). In various scenarios, the data may correspond to control plane or user plane data from a distributed unit at a cell site 109 (FIG. 1A) of a radio-based network 103 (FIG. 1A). In other scenarios, the data may be generated by a customer workload 469 (FIG. 4) executed on the distributed computing device 112. The data may specify a destination that is within a data center 119 (FIG. 1A) of a cloud provider network 203.

In box 506, the edge to region gateway 482 identifies the type of data. For example, the type of data may be ascertained from the identity of the sender, the type of data may be determined through deep packet inspection and classification, the type of data may be determined through a flag associated with the data (e.g., a flag encoding a quality-of-service level). For example, the data type may have an associated latency sensitivity. In one example, different network slices on the radio-based network 103 may be associated with different classifications for purposes of the edge to region gateway 482.

In box 509, the edge to region gateway 482 selects one or more communication links 122 (FIG. 1A) out of multiple communication links 122 between the edge location 113 and a destination data center 119. The selection may be driven based at least in part on the routing rules 472 (FIG. 4), and the type of data may be a factor. The edge to region gateway 482 may also determine from the routing rules 472 how the data is to be sent (e.g., via duplicated copies to maximize reliability and minimize latency for latency sensitive data, or via splitting the data to maximize throughput or increase security). In some cases, the edge to region gateway 482 may utilize a link machine learning model 478 (FIG. 4) to select an optimal arrangement for the data. In some examples, the edge to region gateway 482 may select one communication link 122 based at least in part on a failure of another communication link 122.

In box 512, the edge to region gateway 482 transmits the data to the destination in the cloud provider network 203 using a plurality of communication links 122 as determined. For example, the data may be split into packets, and multiple copies of the packets may be sent over multiple communication links 122. In another example, some packets may be sent via one communication link 122, while other packets may be sent via another communication link 122. The data may be communicated over transmission control protocol (TCP), user datagram protocol (UDP), or another network protocol. The edge to region gateway 482 may perform encapsulation in some scenarios. The encapsulation may correspond to a virtual private network tunnel. In some cases, the tunnel or routing is between the edge to region gateway 482 and an intermediate host rather than the destination.

In box 515, the edge to region gateway 482 may receive link quality data 475 (FIG. 4) from the destination or an intermediate host. For example, the region to edge gateway 424 may report the link quality data 475 based on the observed link quality. In box 518, the edge to region gateway 482 may update routing rules 472 based at least in part on the link quality data 475. For example, if packets are being lost via one communication link 122, the edge to region gateway 482 may update the routing rules 472 to select a different communication link 122 instead. Thereafter, the operation of the portion of the edge to region gateway 482 ends. It is noted that the steps performed by the edge to region gateway 482 in the flowchart of FIG. 5 may be similar to the steps performed by the region to edge gateway 424 in sending data to a destination at an edge location 113 via multiple communication links 122 between the data center 119 and the edge location 113.

Figure 6A:
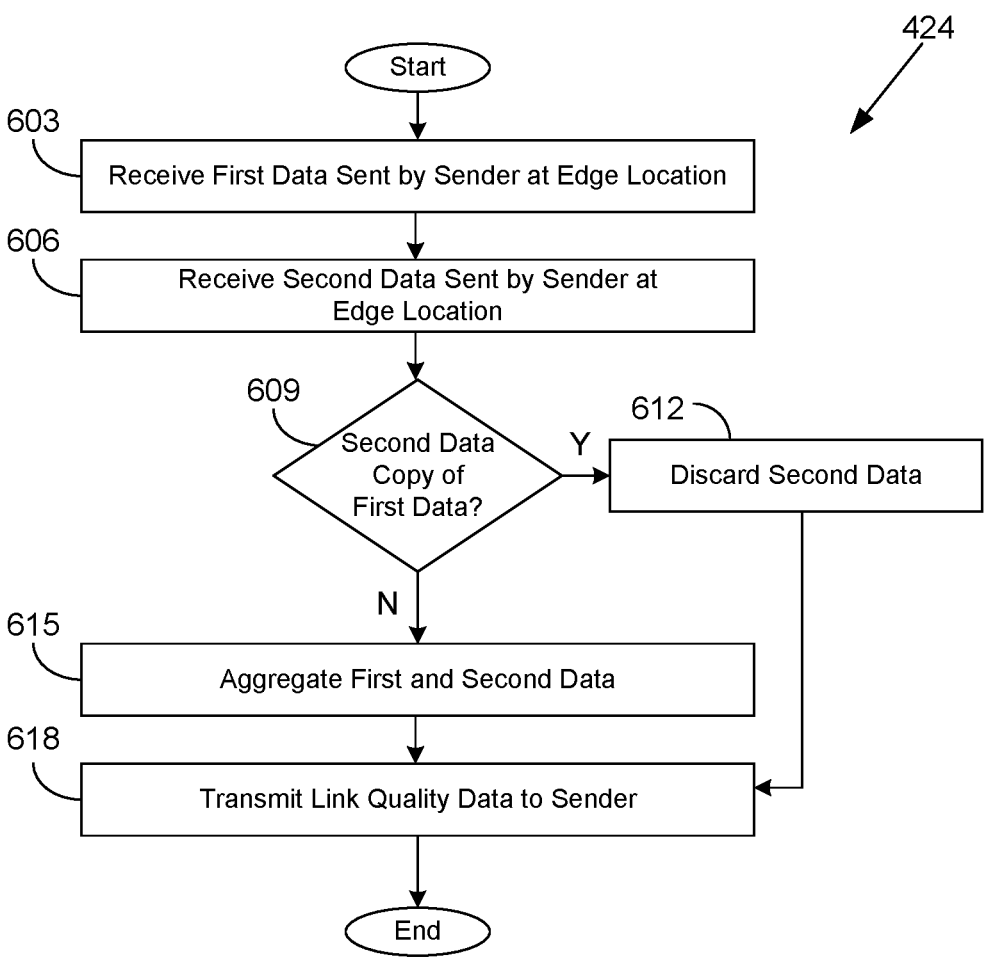
FIG. 6A is a flowchart illustrating one example of functionality implemented as portions of a region to edge gateway executed in a computing environment in the networked environment of FIG. 4 according to various embodiments of the present disclosure.

Continuing to FIG. 6A, shown is a flowchart that provides one example of the operation of a portion of the region to edge gateway 424 according to various embodiments. It is understood that the flowchart of FIG. 6A provides merely an example of the many different types of functional arrangements that may be employed to implement the operation of the portion of the region to edge gateway 424 as described herein. As an alternative, the flowchart of FIG. 6A may be viewed as depicting an example of elements of a method implemented in the computing environment 403 (FIG. 4) according to one or more embodiments.

Beginning with box 603, the region to edge gateway 424 receives first data sent by a sender at an edge location 113 (FIG. 1A) via a first communication link 122. For example, the first data may be from an edge service 480 (FIG. 4) and transmitted by an edge to region gateway 482 (FIG. 1A) to a destination in a data center 119 (FIG. 1A). In some cases, the first data may be fragmented into a set of fragments (e.g., by internet protocol (IP) fragmentation), in which case, the region to edge gateway 424 may reconstitute the first data from multiple smaller fragments.

In box 606, the region to edge gateway 424 receives second data sent by the sender at the edge location 113 via a second communication link 122. For example, the second data may be from the edge service 480 and transmitted by the edge to region gateway 482 to the destination in the data center 119. In some cases, the second data may be fragmented into a set of fragments (e.g., by internet protocol (IP) fragmentation), in which case, the region to edge gateway 424 may reconstitute the second data from multiple smaller fragments. It is noted that the set of fragments may differ for the first and second data even if the first and second data correspond to the same data because of different fragmentation encountered on the first and second communication links 122. The second data may be received by the region to edge gateway 424 after the first data is received.

In box 609, the region to edge gateway 424 determines whether the second data is a copy of the first data. For example, the region to edge gateway 424 may compare the data payload itself or a reference identifier in each of the first and second data identifying the data to determine whether the second data is a copy of the first data. If the second data is not a copy of the first data, the region to edge gateway 424 continues to box 615. In box 615, the region to edge gateway 424 aggregates or combines the first and second data, as each represents a respective portion of a larger data item or stream. The region to edge gateway 424 may also record latency and/or other metrics based on both the first data and the second data in the link quality data 475. The region to edge gateway 424 continues to box 618.

If the second data is a copy of the first data, the region to edge gateway 424 may proceed to box 612 and discard the second data. In other examples, the region to edge gateway 424 may utilize the second data for error checking or error correcting the first data. The region to edge gateway 424 may also record latency and/or other metrics based on both the first data and the second data in the link quality data 475. The region to edge gateway 424 continues to box 618.

In box 618, the region to edge gateway 424 may transmit link quality data 475 to the sender so that the sender can more optimally select from the multiple communication links 122. The region to edge gateway 424 may also update the link machine learning models 478. Thereafter, the operation of the portion of the region to edge gateway 424 ends. It is noted that the steps performed by the in the flowchart of FIG. 6A may be similar to the steps performed by the edge to region gateway 482 in receiving data from a data center 119 via multiple communication links 122 between the edge location 113 and the data center 119.

Figure 6B:
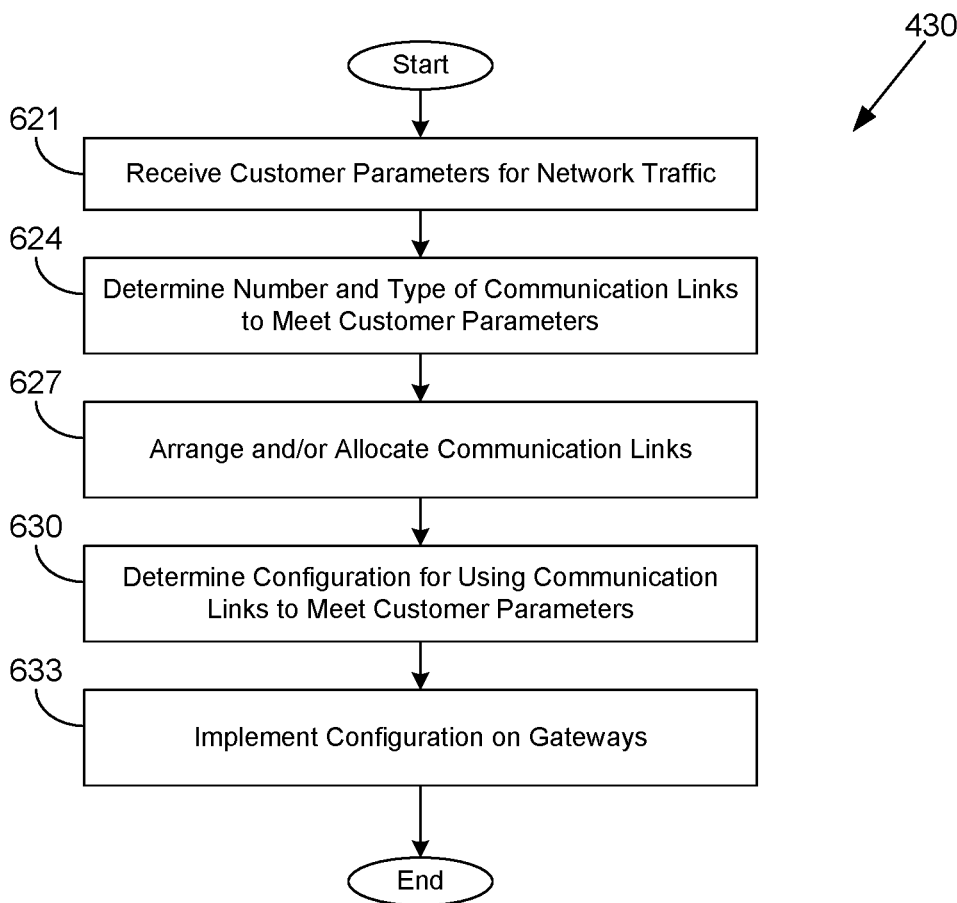
FIG. 6B is a flowchart illustrating one example of functionality implemented as portions of a radio-based network management service executed in a computing environment in the networked environment of FIG. 4 according to various embodiments of the present disclosure.

Turning now to FIG. 6B, shown is a flowchart that provides one example of the operation of a portion of the RBN management service 430 according to various embodiments. It is understood that the flowchart of FIG. 6B provides merely an example of the many different types of functional arrangements that may be employed to implement the operation of the portion of the RBN management service 430 as described herein. As an alternative, the flowchart of FIG. 6B may be viewed as depicting an example of elements of a method implemented in the computing environment 403 (FIG. 4) according to one or more embodiments.

Beginning with box 621, the RBN management service 430 receives one or more customer parameters for network traffic in the radio-based network 103 (FIG. 1A). For example, the parameters may define quality-of-service parameters, such as latency, jitter, throughput, and/or other values. The parameters may apply to certain types of network traffic separately. Also, the parameters may specify constraints such as maximum cost, reliability, lead time, and so on.

In box 624, the RBN management service 430 determines a number and type of communication links 122 (FIG. 1A) between the edge locations 113 (FIG. 1A) and the data centers 119 (FIG. 1A) in order to meet the customer parameters. For example, the RBN management service 430 may determine that three links comprising a satellite link, a 5G radio link, and a fiber link will be suitable for meeting the customer parameters. In making the determination, the RBN management service 430 may refer to data indicating what types of communication links 122 are available at the edge locations 113 and what their characteristics are (e.g., shared or dedicated, costs, bandwidth, latency, reliability, etc.).

In box 627, the RBN management service 430 arranges or allocates communication links 122 as determined to meet the customer parameters. As an example, the RBN management service 430 may initiate an order with one or more communication service providers to deploy particular new communication links 112 between the edge location 113 and the data center 119. As another example, the RBN management service 430 may reallocate an entirety of or a portion of an existing communication link 122 for use by the customer's radio-based network 103.

In box 630, the RBN management service 430 determines a configuration for using the communication links 122 in order to meet the customer parameters. In one scenario, the RBN management service 430 may determine to configure one or more gateways to duplicate data over multiple communication links 122 to reduce latency or improve reliability. In another scenario, the RBN management service 430 may determine to configure one or more gateways to split data being sent over multiple communication links 122 to improve throughput. In box 633, the RBN management service 430 implements the configuration on one or more gateways, such as the region to edge gateway 424 (FIG. 4) and the edge to region gateway 482 (FIG. 4). Thereafter, the operation of the portion of the RBN management service 430 ends.

Figure 7:
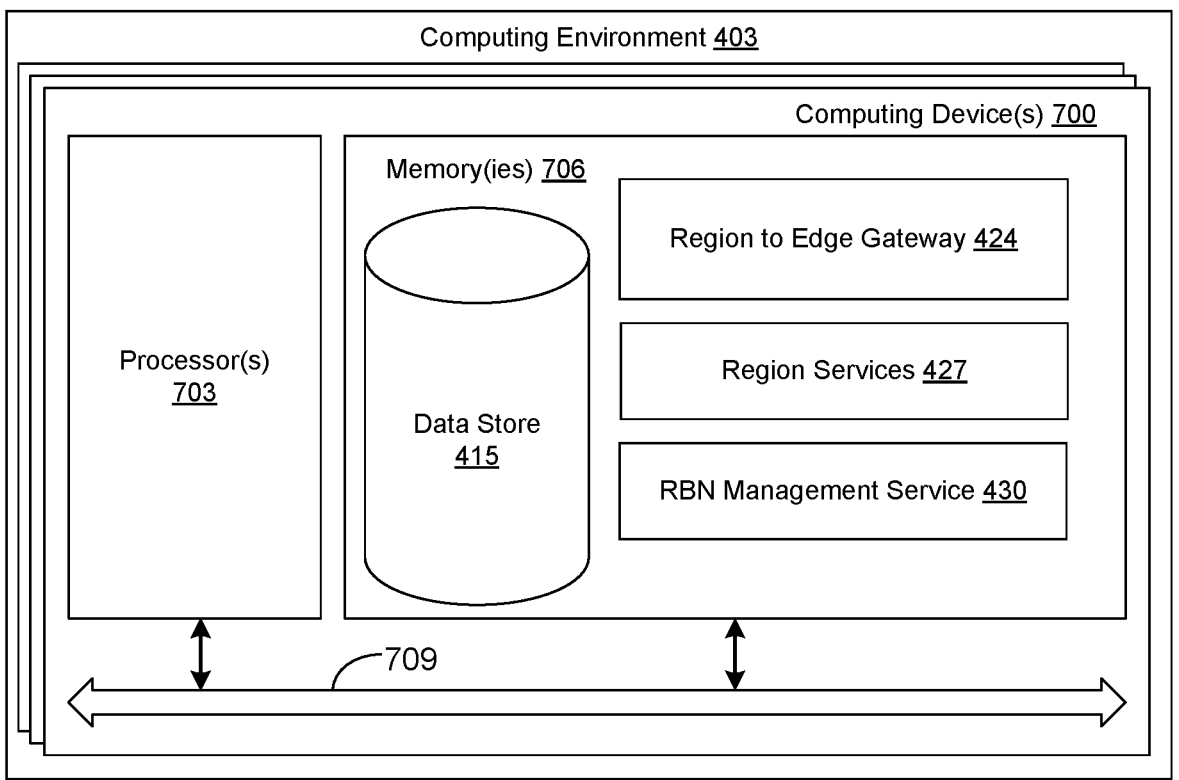
FIG. 7 is a schematic block diagram that provides one example illustration of a computing environment employed in the networked environment of FIG. 4 according to various embodiments of the present disclosure.

With reference to FIG. 7, shown is a schematic block diagram of the computing environment 403 according to an embodiment of the present disclosure. The computing environment 403 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the region to edge gateway 424, the region services 427, the RBN management service 430, and potentially other applications. Also stored in the memory 706 may be a data store 415 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, JavaR, JavaScript2, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the region to edge gateway 424, the region services 427, the RBN management service 430, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6B show the functionality and operation of an implementation of portions of the edge to region gateway 482, the region to edge gateway 424, and the RBN management service 430. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6B show a specific order of execution, it is understood that the order of execution may differ from that which is depicted. For example, the order of execution of two or more blocks may be scrambled relative to the order shown. Also, two or more blocks shown in succession in FIGS. 5-6B may be executed concurrently or with partial concurrence. Further, in some embodiments, one or more of the blocks shown in FIGS. 5-6B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the region to edge gateway 424, the region services 427, and the RBN management service 430, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the region to edge gateway 424, the region services 427, and the RBN management service 430, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

a radio access network (RAN) providing network connectivity to a plurality of client devices, a distributed unit (DU) of the RAN being at least partly implemented at an edge location of a cloud provider network;

a core network implementing one or more network functions for the RAN, the core network being at least partly implemented in a data center of the cloud provider network;

a centralized unit (CU) of the RAN being at least partly implemented in the data center of the cloud provider network;

a plurality of communication links between the edge location and the data center, at least two of the plurality of communication links being different types of communication links; and wherein the DU is configured to transmit data via the plurality of communication links to the CU and the core network.

2. The system of claim 1, wherein the RAN is partly implemented at the data center.

3. The system of claim 1, further comprising:

at least one computing device configured to at least:

identify the plurality of communication links based at least in part on at least one of: a cost parameter, a latency parameter, a throughput parameter, or a reliability parameter; and cause the plurality of communication links to be allocated between the edge location and the data center for use by the RAN.

4. The system of claim 1, wherein the DU is configured to at least:

transmit a first copy of the data via a first communication link of the plurality of communication links; and transmit a second copy of the data via a second communication link of the plurality of communication links.

5. A computer-implemented method, comprising:

receiving data at an edge location of a cloud provider network from a distributed unit (DU) of a radio access network (RAN), the data to be transmitted to a centralized unit (CU) of the RAN in a data center of the cloud provider network; and transmitting the data to the CU in the data center of the cloud provider network via a plurality of communication links from the edge location to the data center, the plurality of communication links comprising at least two different types of communication links.

6. The computer-implemented method of claim 5, wherein a particular communication link of the plurality of communication links comprises a radio-based link connecting a first cell site in a radio-based network with a second cell site in the radio-based network, and the first cell site corresponds to the edge location.

7. The computer-implemented method of claim 5, further comprising selecting a particular communication link of the plurality of communication links for transmitting a first portion of the data based at least in part on a data transfer limit of one or more of the plurality of communication links.

8. The computer-implemented method of claim 5, further comprising selecting a first communication link of the plurality of communication links for transmitting a first portion of the data based at least in part on at least one of: a failure of a second communication link of the plurality of communication links, or link quality data provided by the CU.

9. The computer-implemented method of claim 5, further comprising determining to utilize at least two of the plurality of communication links based at least in part on a latency sensitivity associated with the data.

10. The computer-implemented method of claim 5, further comprising determining to utilize at least two of the plurality of communication links to increase throughput in transmitting the data.

11. The computer-implemented method of claim 5, wherein transmitting the data to the CU further comprises transmitting a respective copy of the data via each of the plurality of communication links.

12. The computer-implemented method of claim 5, wherein transmitting the data to the destination further comprises:

transmitting a first portion of the data via a first communication link of the plurality of communication links; and transmitting a second portion of the data via a second communication link of the plurality of communication links.

13. The computer-implemented method of claim 5, wherein the edge location corresponds to a cell site of the RAN, and at least one core network function of the RAN is at least partly implemented by the data center.

14. The computer-implemented method of claim 5, wherein the edge location hosts the DU.

15. A computer-implemented method, comprising:

receiving a first copy of data sent by a distributed unit (DU) of a radio access network (RAN) at an edge location of a cloud provider network to a centralized unit (CU) of the RAN in a data center of the cloud provider network via a first communication link; and receiving a second copy of the data sent by the DU to the destination via a second communication link, the second copy being received after the first copy, the first and second communication links corresponding to different types of communication links.

16. The computer-implemented method of claim 15, further comprising discarding the second copy of the data.

17. The computer-implemented method of claim 15, wherein the first copy of the data and the second copy of the data are received by an intermediate host in the data center, and the method further comprises:

forwarding, by the intermediate host, the first copy of the data to the CU; and discarding, by the intermediate host, the second copy of the data.

18. The computer-implemented method of claim 15, further comprising:

reconstituting the first copy of the data from a first set of data fragments received via the first communication link; and reconstituting the second copy of the data from a second set of data fragments received via the second communication link, the second set of data fragments differing from the first set of data fragments.

19. The computer-implemented method of claim 15, further comprising transmitting, to the sender, link quality data based at least in part on the first copy being received before the second copy.

20. The computer-implemented method of claim 15, wherein at least one of the DU or CU handles Packet Data Convergence Protocol (PDCP) processing for the RAN, and the data relates to PDCP.

\* \* \* \* \*